(12) United States Patent
Ting et al.

(10) Patent No.: US 6,763,708 B2
(45) Date of Patent: Jul. 20, 2004

(54) PASSIVE MODEL-BASED EGR DIAGNOSTIC

(75) Inventors: Thomas L. Ting, Troy, MI (US); John F. Van Gilder, Webberville, MI (US)

(73) Assignee: General Motors Corporation, Detroit, MI (US)

( * ) Notice: Subject to any disclaimer, the term of this patent is extended or adjusted under 35 U.S.C. 154(b) by 528 days.

(21) Appl. No.: 09/919,489

(22) Filed: Jul. 31, 2001

(65) Prior Publication Data

US 2003/0029233 A1 Feb. 13, 2003

(51) Int. Cl.[7] ............................................. G01M 19/00
(52) U.S. Cl. ..................................................... 73/118.1
(58) Field of Search ............................... 73/118.1, 117.3

(56) References Cited

U.S. PATENT DOCUMENTS

| | | |
|---|---|---|
| 4,671,107 A | 6/1987 | Chiesa et al. |
| 5,190,017 A * | 3/1993 | Cullen et al. ............... 73/117.3 |
| 5,508,926 A | 4/1996 | Wade |
| 5,621,167 A | 4/1997 | Fang-Cheng |
| 5,964,820 A | 10/1999 | Miwa et al. |
| 6,044,826 A | 4/2000 | Bayerle et al. |

* cited by examiner

Primary Examiner—Edward Lefkowitz
Assistant Examiner—Maurice Stevens
(74) Attorney, Agent, or Firm—Kathryn A. Marra

(57) ABSTRACT

A process for computer based, wholly passive, diagnosis of an automotive vehicle exhaust gas recirculation system is disclosed. Use is made of any suitable math model of the vehicle's air intake system to estimate the absolute pressure in the intake manifold, MAP, assuming both a healthy EGR system, $MAP_{HE}$, and a faulty EGR valve, $MAP_{FE}$. Both estimated values are compared with the actual normally measured manifold pressure, MAPmeas. Both comparisons are repeated over many calculations and the differences analyzed to reliably determine whether there is a real restriction to recirculated exhaust flow. A preferred math model of the intake system uses as input variables: mass air flow, barometric pressure, the position command for the EGR valve and engine speed.

10 Claims, 7 Drawing Sheets

PASSIVE MODEL-BASED EGR DIAGNOSTIC

TECHNICAL FIELD

This invention pertains to on-board automotive diagnostic systems. More specifically this invention pertains to a passive model-based diagnostic method for vehicle exhaust gas recirculation (EGR) systems.

BACKGROUND OF THE INVENTION

The modern automobile uses computer executed processes to control engine and transmission operating conditions in order to maintain good fuel efficiency and reduce undesirable exhaust emissions. Associated with each engine-transmission combination is a computerized powertrain control module (PCM) that regulates powertrain functions such as fuel injection, spark advance, ignition and exhaust gas recirculation and transmission shift functions to achieve these goals. Basically, the engine and transmission are operated so as to satisfy the driving requirements of the operator while conserving fuel and reducing unwanted exhaust emissions.

The exhaust from a gasoline fueled internal combustion engine contains nitrogen, nitrogen oxides of various oxygen content ($NO_x$), oxygen, water, carbon monoxide, carbon dioxide and unburned hydrocarbons. A catalytic converter located just downstream of the engine exhaust manifold is used to promote the oxidation of carbon monoxide, the burning of residual hydrocarbons and the chemical reduction of $NO_x$ to nitrogen. It is also the practice to recirculate suitable quantities of exhaust gas from the exhaust manifold into the air induction system during certain periods of engine operation.

Exhaust gas recirculation (EGR) systems have been an integral part of automotive engine systems for many years. They permit the diversion of controlled amounts of engine exhaust from the exhaust manifold or pipe and recirculation of the hot gas into the air induction system of the engine. Under normal engine operating conditions, engine cylinder temperatures can reach more than 3000° F. during combustion. The higher the temperature, the more chance the engine will have $NO_x$ emissions. By introducing exhaust into the cylinders of the engine, the combustion temperature is reduced and the amount of $NO_x$ emissions is significantly reduced.

The PCM is programmed to control the timing and mass flow rate (in, e.g., grams per second) of the EGR stream. EGR is turned off during cranking, cold engine temperature (engine warm-up), idling, and acceleration or other conditions requiring high torque. There are many EGR designs or arrangements. Fundamental to all EGR designs is a passageway or port connecting the exhaust and intake manifolds. The gas pressure in the exhaust manifold is normally higher than the pressure in the intake manifold and exhaust gas can flow to the intake manifold if permitted. A valve is positioned along this passageway that regulates the recirculation stream from zero exhaust gas return flow to some maximum mass flow rate. The control system has proportional control over the EGR valve opening and thereby over the amount of EGR flow. In general, the maximum EGR flow rate is less than about twenty percent of the total flow of air and exhaust gas in the intake manifold.

United States government regulations exist to limit the amount of allowable emissions from standard passenger vehicles. One of the most stringent requirements, encompassed within California's On-Board Diagnostics II (OBD II) regulations, require automakers to not only meet nominal emissions levels for healthy vehicles, but to also equip standard passenger vehicles with an on-board diagnostics system. This system is required to detect certain failures among a prespecified set of engine components which result in a fifty percent increase in emissions over the allowable nominal levels. Actual system performance is evaluated by connecting an emissions bag to the vehicle tailpipe and collecting and analyzing all exhaust gases generated while driving through the Federal Test Procedure (FTP) driving cycle. This procedure is conducted with both healthy vehicles and vehicles with mechanically "created" faults.

Government regulations for EGR valve operation are focused upon detection of reduced exhaust gas flow, i.e. identification of fully or substantially blocked EGR valves. Such valves are deemed to be faulty because of their adverse effect on $NO_x$ emissions. In many current production vehicles the on-board EGR diagnostic addressing this issue relies upon an active test. The vehicle computer control module conducting the diagnostic test waits until a favorable engine operating condition is encountered. Typically the active diagnostic test is conducted with the throttle closed at a moderate to high engine speed as might be encountered during a downhill coast at a vehicle speed greater than thirty miles per hour. Once the proper operating condition is encountered and identified, the diagnostic issues an active EGR spike command. That is, a command is issued to suddenly open the EGR valve momentarily. The command is called active because it is an input to the vehicle which is neither a direct or indirect result of a specific driver request. This spike is about one second in duration and has a peak amplitude corresponding to roughly a 40 percent opening of the EGR valve.

Each modern vehicle has a mass air flow sensor (MAF) and an intake manifold absolute pressure (MAP) sensor that continually supply data to the powertrain control module. The MAF and MAP sensor measurement data for this EGR active test period illustrate the effect on these quantities. The MAF response is relatively flat during the test, corresponding to the fact that the throttle and idle valve positions were essentially unchanged during this period. By contrast, the MAP measurement features a clear spike corresponding to the active EGR spike command. Almost immediately following the end of the EGR command spike, the MAP level returns to its original value prior to the spike. Thus, the entire magnitude of the transient MAP spike is attributed to the EGR command spike, which allows a temporary infusion of exhaust gas into the intake manifold resulting in a momentarily elevated MAP.

For an unrestricted EGR valve, it is possible to analytically compute and experimentally confirm the expected magnitude of the MAP increase associated with a given EGR spike command. Automobile manufacturers have mathematical models that predict the impact of an EGR induced perturbation of MAP. In the on-board EGR diagnostic this value is compared with actual measured MAP increase. If for any reason the EGR valve flow is restricted, this actual measured MAP increase will be reduced. If the magnitude of this increase falls below a designer determined threshold, then the EGR valve operation is deemed faulty.

There are two primary drawbacks with the existing EGR diagnostic. First, since the diagnostic is "active" it involves issuing a non-driver requested command to the vehicle, i.e. the EGR command spike. This results in a very slight "jerk" in vehicle response, which is perceptible to some drivers and negatively impacts vehicle drivability. Second, and perhaps more important, due to the timing of the EGR command spike, which is selected to optimize detection capability, running the EGR diagnostic itself generates a significant amount of emissions. Under normal driving conditions the active EGR diagnostic runs about once every vehicle trip. This diagnostic typically runs only once during the FTP cycle test but contributes a major portion (i.e. 20–25%) of the total $NO_x$ emissions collected during this test. Since these emissions are required to remain below specified nominal levels, elimination or reduction of emissions associated with this active test would be beneficial.

It is an object of this invention to provide a method of detecting a flow restriction in the EGR system without interfering with vehicle operation.

SUMMARY OF THE INVENTION

This invention provides a completely passive EGR diagnostic algorithm and an error processing method for determining whether an automotive vehicle EGR system is healthy or faulty.

The passive EGR diagnostic algorithm uses two math models to represent different states of EGR system health. In a preferred embodiment of the invention, vehicle operating conditions including mass air flow (MAF), EGR valve command, engine speed and barometric pressure are used in the models to produce estimated values of manifold absolute pressure (MAP). A first model is used to estimate a value for MAP assuming that there is no flow restriction in the EGR valve or system. If the EGR system is free of defects (i.e., it is healthy) then, ideally, the measured MAP value is close to the estimated value of MAP for a healthy EGR system. A second math model is used to estimate MAP assuming a sufficiently blocked EGR value, a fault requiring detection by the on-board diagnostic system. For example, if the normal, unobstructed flow diameter of an EGR valve is 10 mm, the model for the faulty obstructed EGR system might assume the faulty flow diameter to be 3 mm. Again, if the EGR system is healthy, the measured value of MAP should be close to the first estimate and appreciably different from the second MAP estimate. On the other hand, if the EGR system has a significant restriction (from 10 mm to 3 mm diameter) then the measured MAP should be close to the estimated value for MAP in a faulty EGR system.

Suitably, the models focus on air flow and exhaust recycle flow in the engine intake manifold and on the pressure in the manifold. One model is employed to estimate a regularly measured condition of the vehicles induction system such as MAP assuming normal unrestricted flow through the EGR valve. One or more additional models are employed to simulate the effect of a defective EGR system on MAP. Preferably one model is employed that is intended to mimic an EGR fault required for detection by an on-board diagnostic system. Again the second model estimates an already sensed or measured engine operating parameter such as MAP. Thus, a first important aspect of the invention is the use of math models to estimate contrasting operating aspects of the vehicle's EGR system. A second important aspect of the invention is that both estimated values are compared with the measured current engine value.

In the comparison of estimated healthy and faulty MAP values, for example, with the current measured MAP value, mathematical steps are employed to reduce the effect of signal noise and other distortions and to reach a normalized comparison of the values that suitably indicates whether an EGR fault actually exists. In this approach, an EGR fault is declared if, and only if, both 1) the discrepancy between the MAP measurements and healthy MAP estimates is sufficiently large and 2) the discrepancy between the MAP measurements and a "faulty" MAP estimate is sufficiently small. Preferably, the mathematical result of the comparison of estimated and measured MAP values is compared in the PCM with experimental engine data produced from representative healthy and faulty EGR systems. Thus, in accordance with the process of this invention, an EGR fault is not declared solely on the basis of a deviation from supposed normal system behavior. In addition, the resulting MAP measurement signature must adequately resemble a predicted MAP signature obtained from a faulty EGR system model.

Other objects and advantages of the invention will become more apparent from a detailed description of the specific embodiments of the invention which follow.

DESCRIPTION OF THE PREFERRED EMBODIMENT

A primary objective of this project is to develop a diagnostic algorithm that can monitor the health of EGR valve operation without injecting "active" signals and without additional sensors. Generally speaking, the key to developing a robust, passive component diagnostic is to identify a measured variable that is sensitive to faults in that component, but insensitive to faults in other system components. For EGR valve operation, this is difficult to accomplish because the commanded EGR valve position is closely related to throttle position. In reality, there are almost no instances (aside from the existing active test commands) where the EGR valve is commanded open while the throttle remains shut. In addition, the combined mass air flow through the throttle and idle valves typically dwarfs the exhaust gas flow through the EGR valve. For these reasons, an effective, robust passive EGR diagnostic algorithm requires a more complex design approach. In this invention, the process is based on signal correlation studies between measured and predicted vehicle outputs.

The proposed passive EGR diagnostic algorithm is based upon the following idea. Use slightly different mathematical models of the engine air intake system to simulate two different scenarios: 1) a healthy vehicle and 2) a vehicle with an EGR fault. Use these simulation results to generate two different MAP estimates, a healthy vehicle MAP estimate and an EGR faulty vehicle MAP estimate. Compare the time histories of each of these two estimates with the time histories of the true MAP sensor measurements. If the vehicle is healthy then the MAP measurements should resemble the healthy vehicle MAP estimates. If the vehicle is EGR faulty then the MAP measurements should resemble the EGR faulty vehicle MAP estimates.

MAP Estimates and Errors

Figure 1:
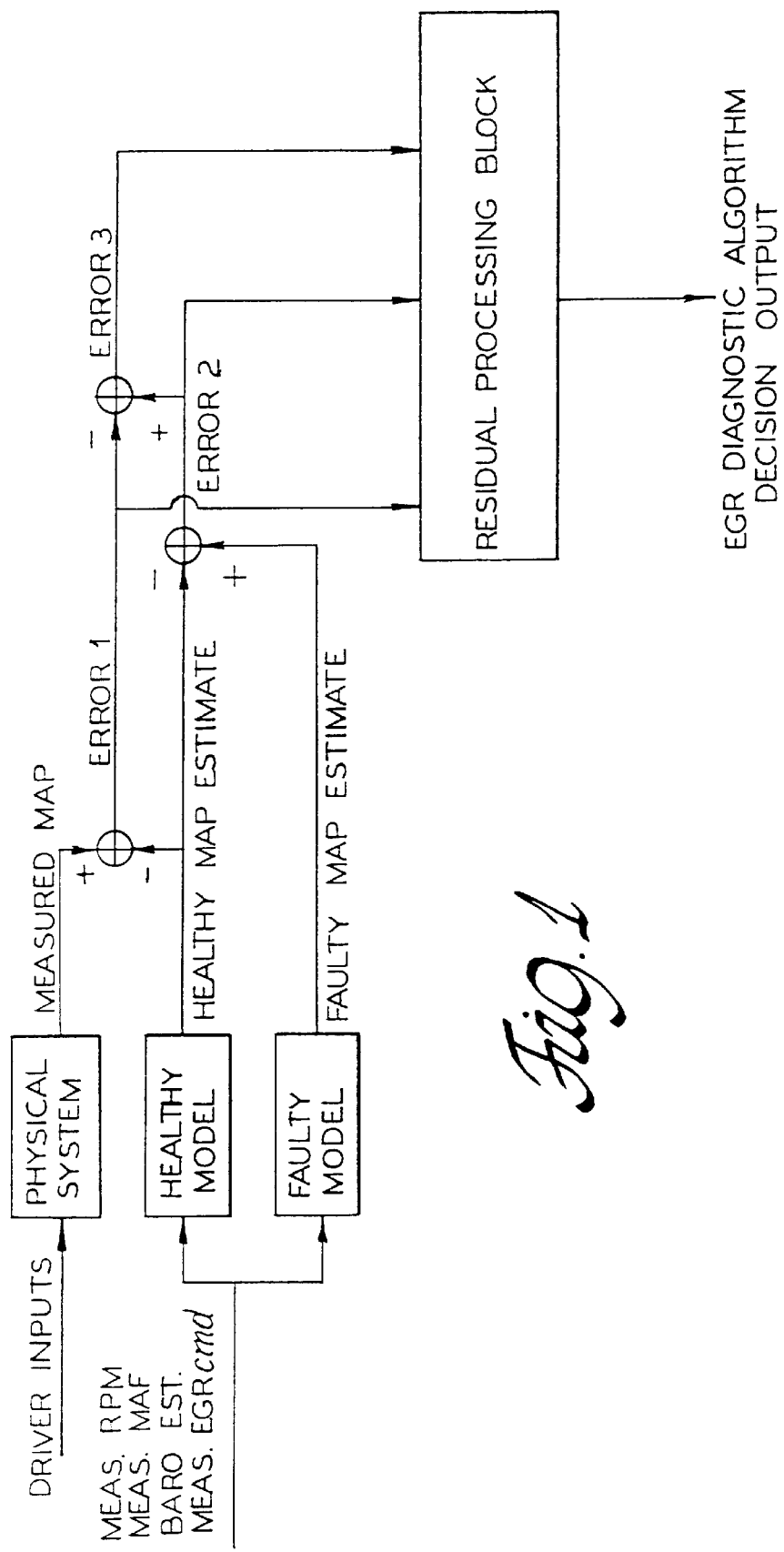
FIG. 1 is a calculation flow diagram illustrating a practice of this invention in which actual manifold absolute pressure (MAP) is measured and compared with estimated MAP values using a model for a healthy EGR system and a model for a faulty EGR system, respectively, as a basis for an on-board passive EGR diagnostic system.

FIG. 1 is a flow diagram that illustrates the above process outline. Of course, driver inputs affect engine operation and whether EGR is used. After engine warm up, the driver input that most affects the air intake system (the physical system box in FIG. 1) including exhaust gas recirculation is throttle actuation and position. That input and the responding intake air flow, the EGR flow, if any, and the overall engine air flow lead to a resulting manifold air pressure which is continually detected by the MAP sensor. Line 1 of Figure represents such inputs to the physical engine operating system and the resulting MAP, values of which are continually detected by the MAP sensor and stored in the PCM or a like microprocessor dedicated to diagnosis of vehicle systems.

Lines 2 and 3 of FIG. 1 illustrate inputs to a suitable model for estimating values of MAP for properly functioning EGR valves (a healthy EGR system, line 2) and for blocked EGR valves (a faulty EGR system, line 3) respectively. The inputs for the engine air intake system, of which EGR is a component, are engine speed, e.g., rpm; mass air flow rate (MAF, typically in kg/s); barometric pressure (in kPa) and current EGR valve command (e.g., measured in percentage (0–100) of its fully open position). Engine rpm values and MAF values are continually detected and entered in the memory of the PCM. The current EGR valve position is noted by the PCM and used in both the healthy and faulty EGR model estimates of MAP. Barometric pressure is often estimated from other measured engine operating variables.

FIG. 2 again shows the four stated engine operating variables as inputs to a suitable engine air intake system mathematical model for producing an estimate of MAP. It is seen that a preferred intake system model for EGR diagnosis does not use, and is thus independent of, the throttle position and idle valve position measurements. This is significant because not only are EGR commands highly correlated to throttle commands, as mentioned above, but also because the throttle body has been identified as a primary source of vehicle-to-vehicle variations. Since isolation from the throttle body would greatly enhance algorithm robustness, only this no-throttle MAP estimate was used for the passive EGR diagnostic algorithm.

Reference is again made to FIG. 1. It is to be understood that estimated values of MAP for both healthy and faulty EGR systems are continually being made by the PCM just as measured values are continually being stored. These estimated MAP values are suitably made using the engine air intake system model referred to above and described in more detail in a following section of the specification.

In accordance with a preferred embodiment of the invention, the current healthy EGR system MAP estimate and the faulty system MAP estimate are compared with the current measured value of MAP. As illustrated in FIG. 1, the healthy MAP estimate (line 2), $MAP_{HE}$, is subtracted from the measured MAP, MAPmeas, to produce a value called Error 1.

$$\text{Error 1} = MAPmeas - MAP_{HE}$$

The second signal, called Error 2, is defined as a predicted MAP estimation error due to an EGR restriction (line 3). This represents the difference between a simulated EGR faulty vehicle MAP estimate, $MAP_{FE}$, and a healthy vehicle MAP estimate. This signal represents the predicted no-throttle MAP estimation error due to an EGR restriction.

$$\text{Error 2} = MAP_{FE-MAPHE}$$

A third signal, called Error 3, is defined as the difference between the two error signals defined above, i.e. Error 2–Error 1. This signal represents the difference between an EGR faulty vehicle MAP estimate and the measured MAP signal.

$$\text{Error 2} - \text{Error 1} = MAP_{FE} - MAP_{HE} - [MAPmeas - MAP_{HE}]$$
$$= MAP_{FE} - MAPmeas$$

These three signals are used to check the following primary premise. This is indicated in the Residual Processing Block of FIG. 1. If a true EGR fault (blockage or flow restriction) is present then the signals, Error 1 and Error 2 (MAP estimation error and the predicted MAP estimation error due to an EGR restriction), should be similar. Thus the "size" of Error 3 (the difference between these two signals) should be small. A specified example of the analysis of the three error values is described below in connection with FIG. 8. However, before proceeding with a discussion of how a decision output of the EGR diagnostic algorithm may be reached, a discussion should be had of illustrative models for healthy and faulty EGR system MAP estimators.

Engine Intake System Models

In accordance with a preferred embodiment of this invention estimates of values of manifold absolute pressure may be made using any suitable engine air intake manifold or system model. All automobile engine manufacturers employ such models as a basis for powertrain control systems and engine diagnostics.

Figure 2:
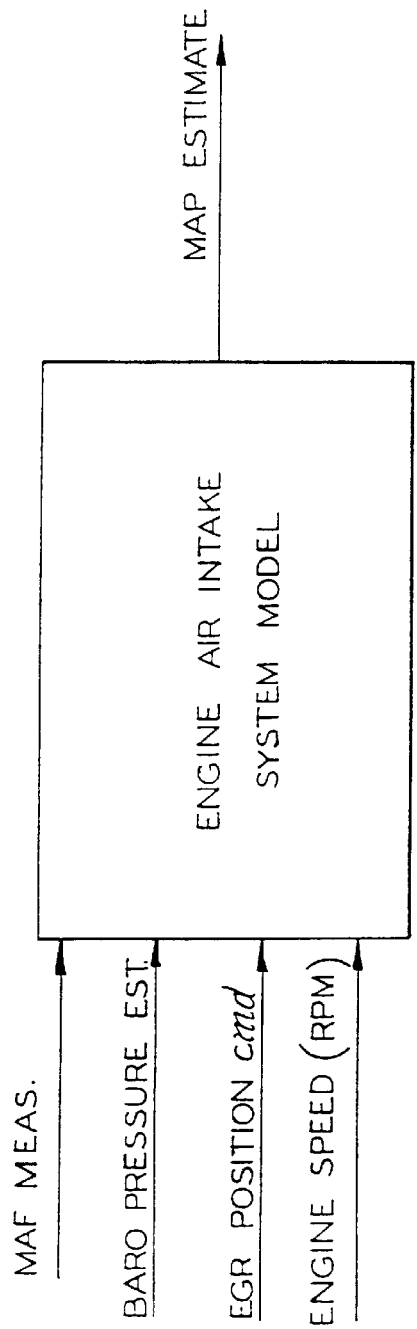
FIG. 2 is a block flow diagram illustrating suitable engine operating variables for use in engine air intake system models for estimating MAP values of healthy and faulty EGR systems.

FIG. 2 illustrates preferred specific inputs (not including throttle position) for a way of estimating MAP values using a model of the engine air intake system. These inputs comprise measurements of mass air flow (MAF), a measurement or estimate of barometric pressure, the current PCM command position for the EGR valve and a measure of engine speed, typically available in rpm from the crankshaft position sensor. For an estimate based on a healthy EGR system the actual command position may be used. For a faulty EGR system estimate, the actual command is used but strict flow limits are placed on the output of the EGR flow calculation. The output of such a model is an estimate of MAP, suitably in kPa.

Figure 3:
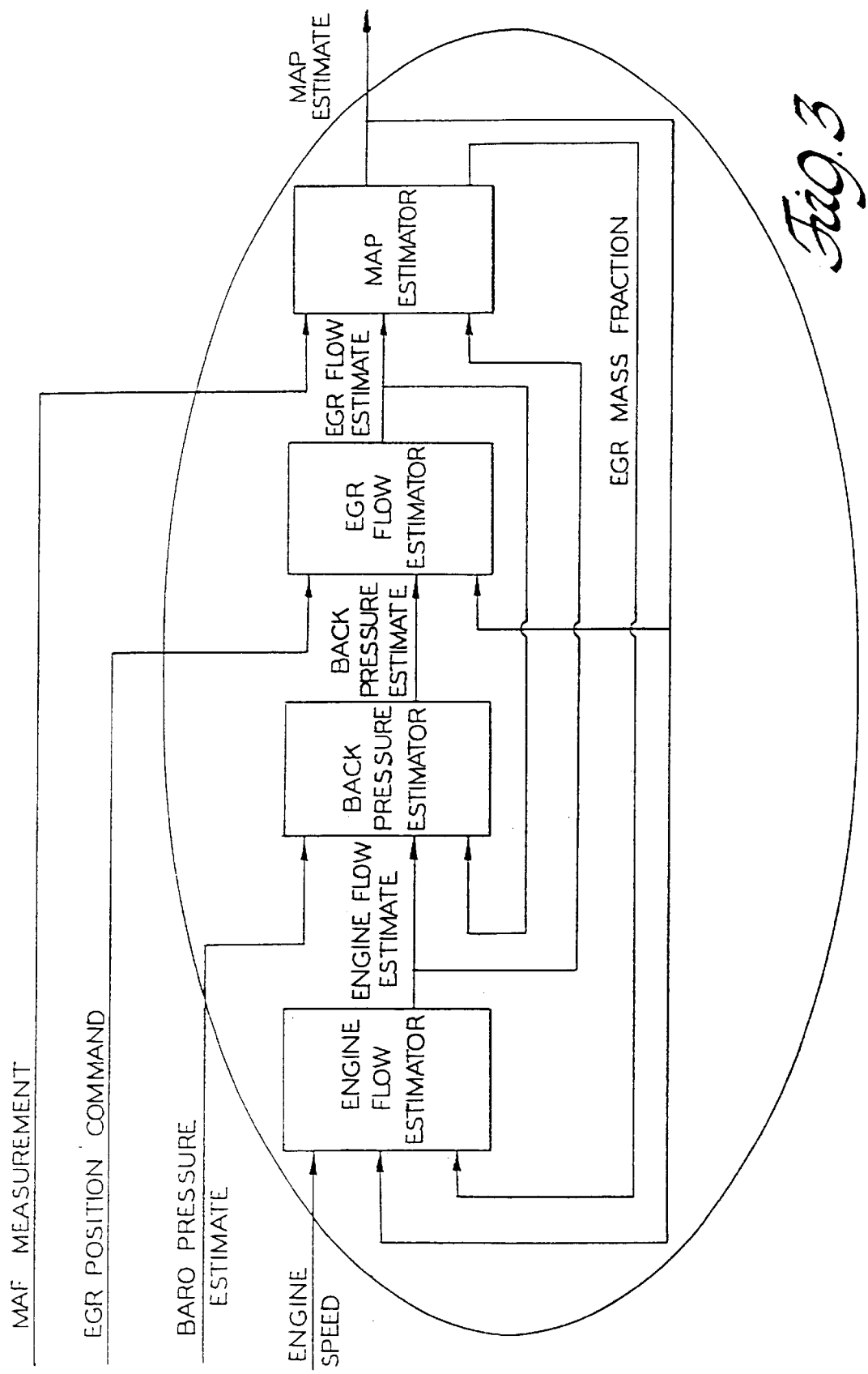
FIG. 3 is an expanded version of FIG. 2 showing a calculation flow diagram of a model for estimating MAP values for the engine air intake system.

FIG. 3 is an expansion of the information illustrated in FIG. 2. FIG. 3 shows the same engine variable inputs to a series of calculation blocks for the intake system model. FIG. 3 is an architecture of the data flow of a preferred model for estimating manifold absolute pressure values based on healthy and faulty EGR systems. The calculations contemplated from the models illustrated schematically in FIGS. 2 and 3 would be performed on the vehicle's PCM or a like computer for vehicle diagnostics. The calculations would be made continually, suitably every 100 milliseconds, during engine operation regardless of whether the PCM has commanded that the EGR valve be open. Thus, it is contemplated that the calculations of estimated MAP values be repeated over several hundred or even several thousand times and that these estimated values be compared to stored values of actual measured manifold absolute pressure in error analyses as outlined in FIGS. 1 and 8.

A basis of intake system models used by automobile engine manufacturers is a mass flow balance into and from the vehicle's intake manifold. The flow rate out of the manifold is a function of engine speed. Air and sometimes exhaust gas are the streams that flow into the manifold and are mixed for use in the engine.

The main entering stream is ambient air that flows under barometric pressure into the manifold as permitted by the vehicle's throttle and idle air control valve. This airflow is typically continually measured by a mass air flow rate (MAF) sensor. Typical MAF values are in the range of 4 to 100 g/s. Such flow rate is dependant upon manifold pressure, ambient barometric pressure and throttle and idle valve positions. Many PCM's estimate barometric pressure so that a separate sensor is not required.

When exhaust gas re-circulation is employed some exhaust gas is also drawn into the induction system usually downstream of the mass airflow sensor and upstream of the intake valves of the respective cylinders. EGR flow is a function of EGR valve opening and the difference between the exhaust gas pressure, called back pressure, and MAP.

For purposes of description, the use of this specific intake system model is broken down into calculation blocks. Referring to FIG. 3, the first calculation block proceeding from left to right is the Engine Flow Estimator calculation. The second calculation block is the exhaust stream Back Pressure Estimator calculation block. The third calculation block is the EGR Flow Estimator calculation and the concluding block of this specific example is a MAP Estimator calculation which includes an EGR mass fraction calculation.

The lines and arrows of FIG. 3 show the flow of data inputs and flow of calculated values in estimating each value of MAP. During a specific analysis of the EGR system, the estimates of $MAP_{HE}$ and $MAP_{FE}$ are made many times. In each sequential estimate calculation the current measured engine operating variable is used, or the last estimated value of an input, as appropriate.

The PCM typically commences the estimation process of this invention at engine start. However, the resulting data is not considered reliable until engine warm up has been achieved as indicated by engine coolant temperature. Subsequent to this initial warm up period, the calculations of this process would be continued thereafter during normal computer cycles. However, obviously irrelevant values of estimated MAP, such as when the EGR valve is commanded to be closed, would be discarded. Suitable initial values are set for the estimated value of MAP and the position of the EGR valve. These values are used in the model outlined in FIG. 3. The initial values of the MAP estimate may be set to an arbitrary value such as 40 kPa and zero for the EGR mass fraction value. Of course, these values will be replaced with new estimates in the next calculation cycle.

The calculations of some flow streams in this example are based upon the ideal gas law, PV=mRT. In the following example, pressure, P, will be in kPa; volume, V, in m$^3$; temperature, T, in degrees K; mass, m, in kg; and the constant, R, will accordingly have a value of 287 m$^2$/s$^2$K. From the ideal gas law it is clear that m=PV/RT. Thus, taking the derivative of the equation with respect to time (assuming no pressure or temperature change during the calculation cycle) one obtains mdot=P(Vdot)/RT.

Figure 4:
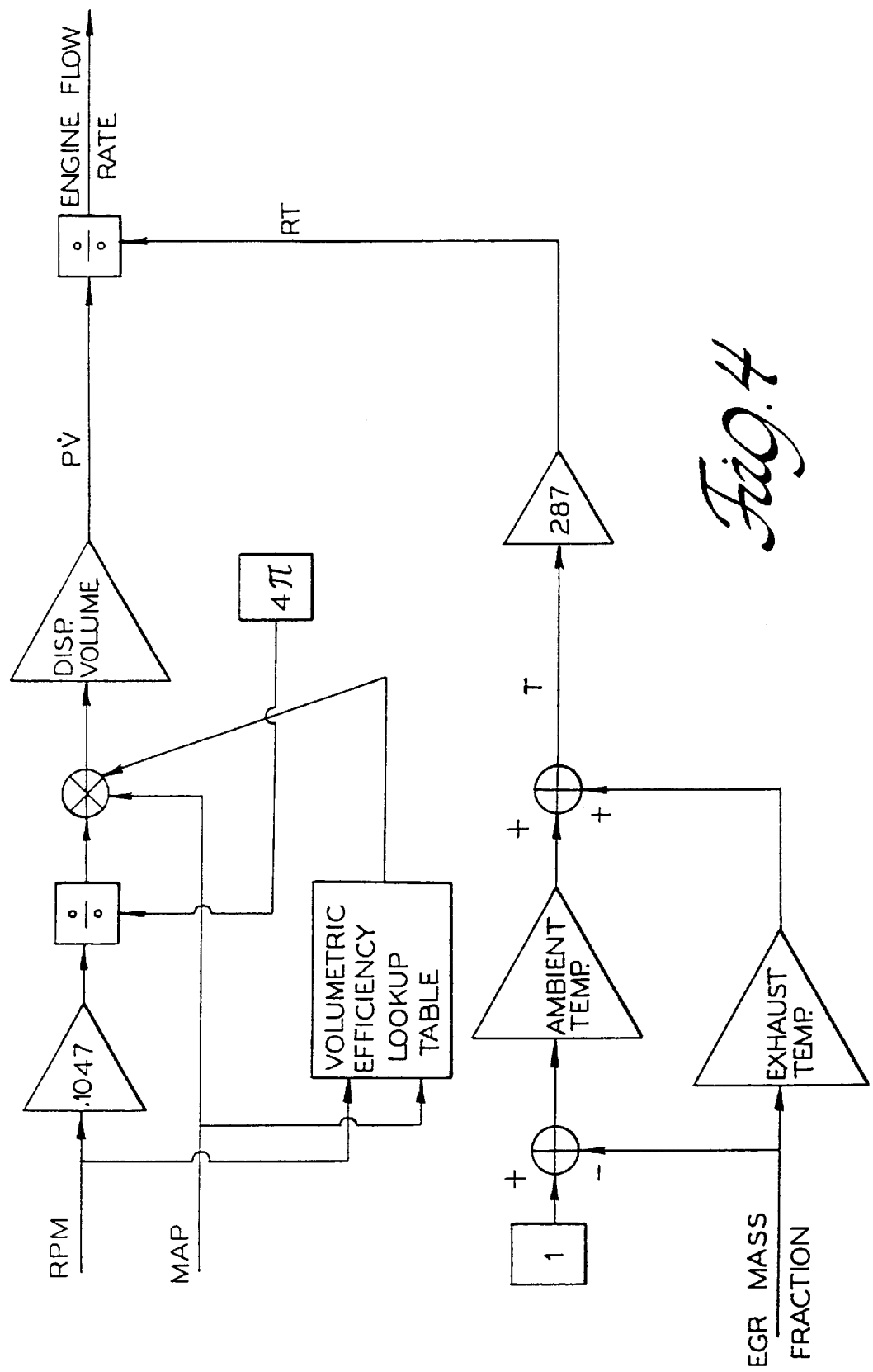
FIG. 4 is a calculation flow diagram for the Engine Flow Estimator block of FIG. 3.

FIG. 4 is a flow diagram of calculations for the gas flow rate into the engine, the Engine Flow Estimator block of FIG. 3. The FIG. 4 diagram is to be read from left to right. The indicated steps estimate the engine flow rate in kg/s at each calculation using engine speed, initially in rpm; the current estimated value for MAP, arbitrarily fixed as 40 kPa in the first cycle; and the contribution from exhaust gas mass fraction, arbitrarily fixed at zero in the first estimate. As will be seen EGR flow is estimated in a later step of the model and that value will alter the EG mass fraction in the next calculation cycle.

The calculation illustrated in FIG. 4 converts engine speed in rpm to an engine gas mass flow rate using the current estimated value of MAP, either $MAP_{HE}$ or $MAP_{FE}$, depending on the purpose of the present calculation. The design displacement volume of the engine, the volumetric efficiency of the engine at current operating conditions, manifold pressure and gas temperature are also used in this step of the calculation.

Referring first to the top half of FIG. 4, engine rpm is converted to radians per second by multiplying by $2\pi/60$, (0.1047). Engine speed in radians per second is then divided by $4\pi$ (to account for two engine revolutions per cycle) to yield engine cycles per second. This value is multiplied by the MAP estimate.

In a parallel step, engine speed and MAP values are used as arguments to enter a two dimensional look-up table in the PCM database to determine the present volumetric efficiency of the vehicle engine. This value multiplied by the fixed displacement volume of the engine, engine cycles per second and manifold pressure yield the P(Vdot) term.

The lower portion of FIG. 4 provides the RT term in the equation mdot=P(Vdot)/RT. A linear combination is made of the temperatures of the EGR gas and the fresh air intake in proportion to their intake fraction. As stated above, the EGR mass fraction may be set at zero absent a current value. If intake air temperature or exhaust temperature is not measured, the air temperature may be assumed to be 298K and the exhaust temperature 400K. The combination of the flow fractions and temperatures yields an intake air/exhaust gas mixture temperature, T, which is used in this calculation and later. T is multiplied by R which has a value of 287 m$^2$/s$^2$K. The RT term is divided into the P(Vdot) term to yield the flow from the intake manifold into the engine in kg/s.

Thus, the calculation process of FIG. 4 yields the output of the Engine Flow Estimator block of FIG. 3. As shown in FIG. 3 this engine flow rate value in kilograms per second is used both in the Back Pressure Estimator and the MAP Estimator calculation blocks of that figure.

Figure 5:
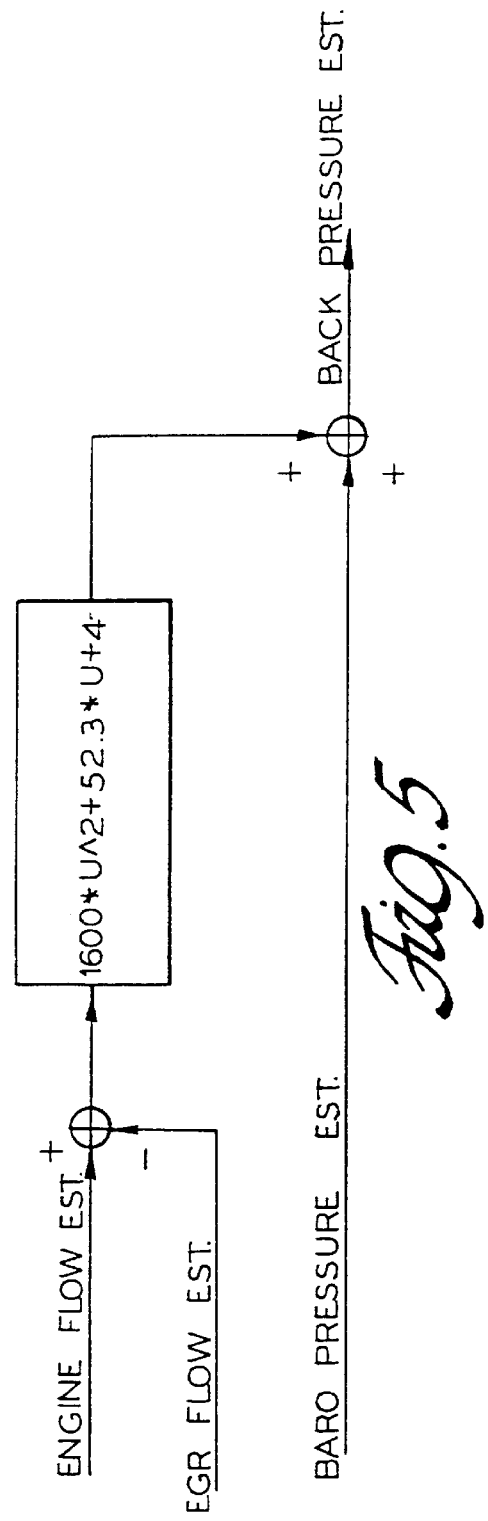
FIG. 5 is a calculation flow diagram for the Back Pressure block of FIG. 3.

The estimation of MAP now proceeds to the Back Pressure Estimator block. As seen in FIG. 3, the inputs to the Back Pressure estimator block are estimated barometric pressure, the engine flow estimate and the estimate of EGR flow rate. An exemplary calculation of estimated back pressure in the exhaust manifold is shown in FIG. 5. Determination of back pressure is necessary because it is the up-steam pressure on the EGR valve. This pressure and MAP, the down-steam pressure on the valve, affect the flow rate of exhaust gas through the EGR system.

In the calculation illustrated in FIG. 5, the approach is to estimate back pressure by adding a pressure increment to estimated barometric pressure. This incremental pressure addition is based on the difference between the total engine flow estimate (which correlates to the total exhaust stream) and the EGR flow which is removed from the exhaust stream. It is found in analyzing test data for an engine that back pressure can be correlated to the difference in these flows. A regression analysis on these flows for a particular 3.8 liter, six cylinder engine yields the quadratic function in the calculation block of FIG. 5 for this relationship. The value of engine flow less the EGR flow is the input U to the quadratic function in the calculation block. The output of the calculation block is the increment which is added to the estimated barometric pressure to obtain the estimated back pressure value. This back pressure value is the output of FIG. 5 and the Back Pressure Estimator block of FIG. 3. Typical values of back pressure are in the range of 104–120 kPa.

In accordance with FIG. 3 the calculation then moves to the EGR Flow Estimator block. The inputs for EGR flow are the EGR position command, the estimate of back pressure and the estimate of manifold pressure. Obviously EGR flow is affected by whether the EGR valve is open and by the difference between the back pressure on the up stream side of the EGR valve and the manifold pressure which is on the down steam side of the valve.

Figure 6:
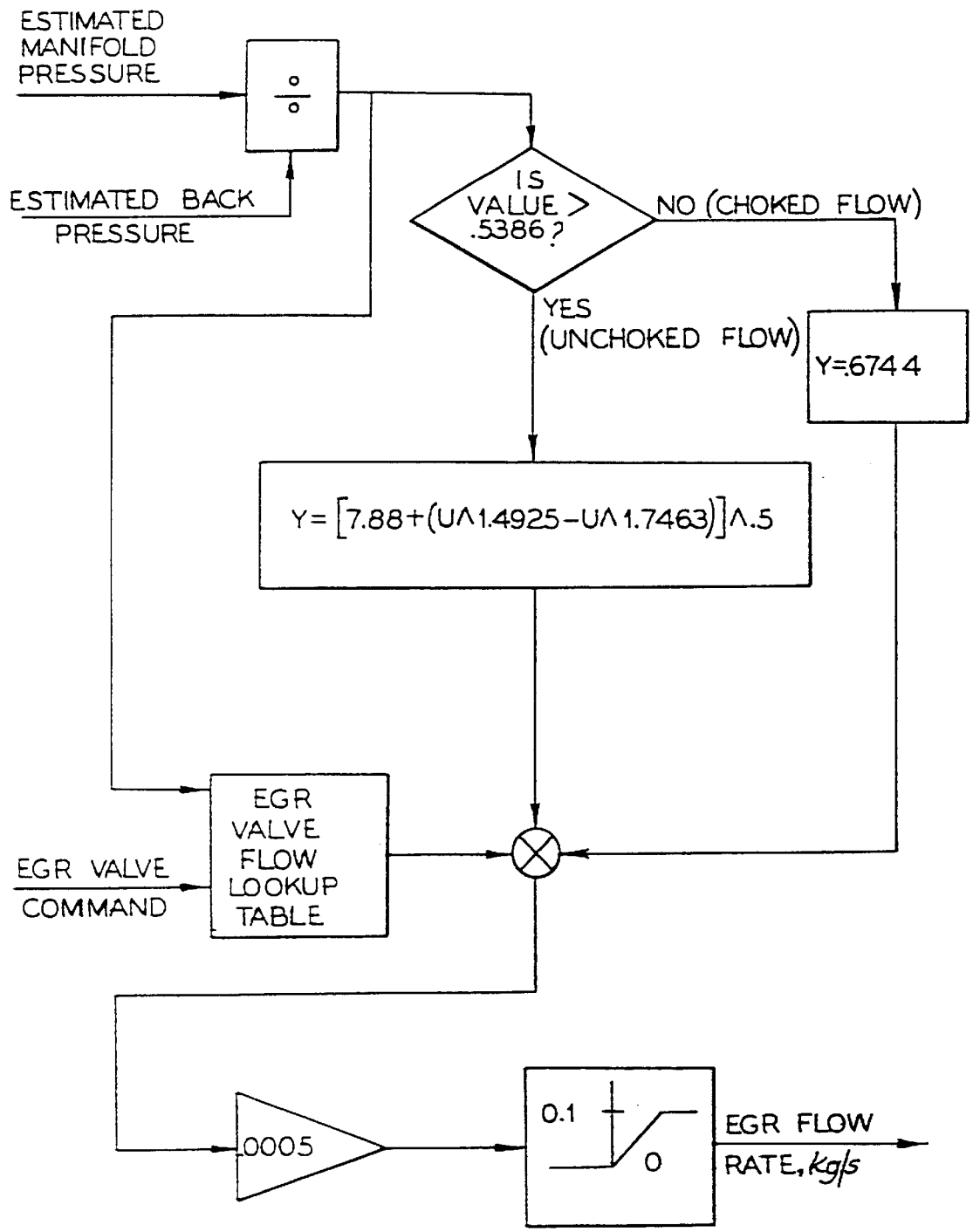
FIG. 6 is a calculation flow diagram for the EGR Flow Block estimator of FIG. 3.

FIG. 6 illustrates a typical calculation for estimating EGR flow rate in kilograms per second. EGR valves are manufactured items which are typically specified for an engine family. The valves have a movable pintle and gas flow through the valve is governed by both the position of the pintle and the pressure drop across the valve. The pressure drop is based on the difference between exhaust back pressure and MAP.

At the beginning of the FIG. 6 calculation the appropriate estimated manifold pressure is divided by the estimated back pressure. This ratio which has a value between 0 and 1 is used in two aspects of the calculation. In one aspect shown in FIG. 6, the ratio is used with the EGR valve position command to enter a two-dimensional look-up table that is experimentally derived for the engine and has an output of EGR flow in grams per second in this example. This nominal EGR flow rate is then adjusted by an EGR flow factor related to whether the flow path is perceived to be choked or unchoked. The pressure ratio is also used in FIG. 6 to determine whether there is a choked flow in the manifold.

In this example, if the ratio of manifold pressure to back pressure is greater than 0.5386, an unchoked flow situation exists, and the EGR flow factor is determined by the calculation block in FIG. 6. The pressure ratio is used as the input U in the equation $Y=[7.88(U^{1.4925}-U^{1.7463})]^{0.5}$. The nominal flow rate is multiplied by Y to obtain an EGR flow in grams/s.

If the pressure ratio is less than 0.5386 then choked flow in the exemplified system exists and the EGR flow factor, Y, is set at 0.6744. The nominal flow rate from the lookup table is multiplied by this value of Y to obtain the estimated EGR flow rate.

In the example of FIG. 6, the EGR flow rate in g/s is scaled by a factor of 0.0005 to account for additional flow losses in the EGR system and to convert the flow rate to kg/s. Maximum expected EGR flow rates are of the order of 0.01 kilograms per second in, for example, a typical 3.8 liter nominal displacement engine. In order to eliminate clearly erroneous values, the estimated EGR value is put through a limiter to assure values that are less than 0.1 kilograms per second. The limiter calculation is the last block in the lower right corner of FIG. 6.

The output of FIG. 6 is also the output of the EGR Flow Estimator block of FIG. 3. The above discussion of FIG. 6 illustrates the estimation of EGR flow for a healthy EGR system and that flow rate would be used in the calculation of a value for $MAP_{HE}$. When $MAP_{FE}$ is being estimated, a modification of the above EGR flow rate process must be made.

When the EGR flow rate calculation is performed for the faulty EGR system the upper threshold of the limiter is decreased. For example, a healthy EGR valve may have a diameter opening of 10 millimeters. One could assume that the faulty EGR flow rate corresponds to an opening of only 3 millimeters in diameter. Then the proportion of the restricted cross sectional flow area to the unrestricted cross sectional flow area is 3 mm$^2$ to 10 mm$^2$. This ratio of 0.09 is multiplied by the maximum expected EG flow through an unobstructed EGR valve to obtain a threshold for the limiter in the calculation of the estimated EGR flow for the faulty EGR case.

Figure 7:
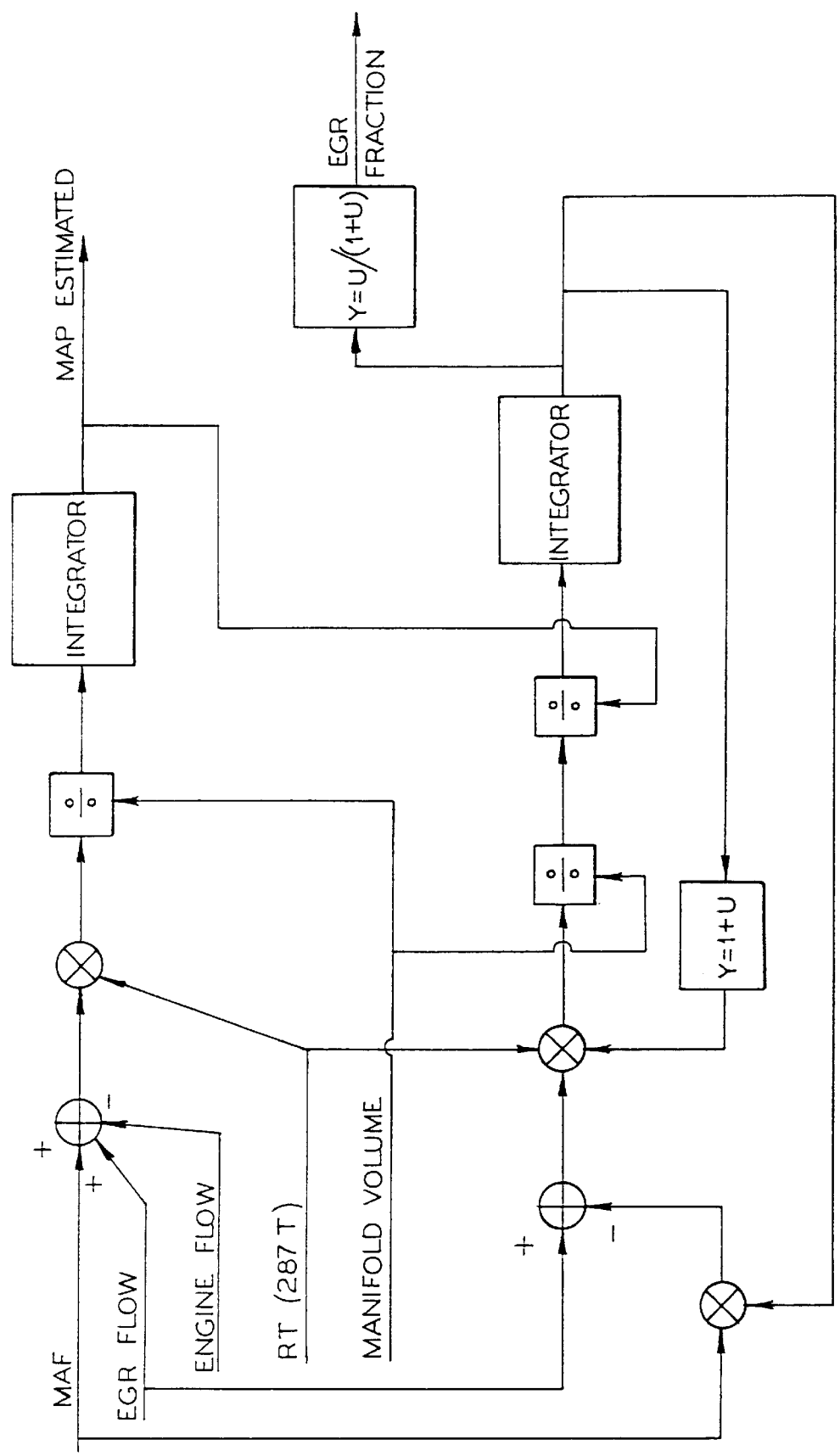
FIG. 7 is a calculation flow diagram for the MAP Estimator Block of FIG. 3 and for the EGR fraction calculation for that figure.

The MAP calculation illustrated in FIG. 3 now moves to the MAP Estimator calculation block. The EGR fraction is also calculated at this time. As seen in FIG. 3, the inputs to the MAP estimator calculation are the sensed MAF value, the EGR flow estimate and the engine flow estimate. The output of the MAP Estimator block is a EGR mass fraction and either $MAP_{HE}$ or $MAP_{FE}$. Reference is made to FIG. 7 where these calculations are illustrated. The upper portion of the calculation illustrated in FIG. 7 uses the ideal gas law in a rearranged form, P=mRT/V. Both sides of the equation are differentiated with respect to time to yield the differential equation Pdot=mdot (RT/V).

The value of mdot is the change in air mass in the air intake manifold and is thus equivalent to the total flow into or out of the manifold. The current measured value of MAF plus the estimated EGR flow represent the flow into the manifold. The engine flow is the flow exiting the manifold. MAF and EGR are added and engine flow subtracted. The resulting sum may be positive or negative, depending on whether there is net inflow or outflow.

Continuing from left to right in FIG. 7, the positive or negative sum is multiplied by the ideal gas constant (287) and the air/exhaust gas mixture temperature determined in the Engine Flow Estimator calculation. This product is divided by the fixed manifold volume to yield Pdot. This quantity is input to an integrator which outputs either $MAP_{HE}$ or $MAP_{FE}$. The value of estimated MAP is used in the passive analysis of the EGR system described in more detail below. As shown in FIG. 3, the value is also used in the next calculation cycle of Engine flow and EGR flow.

Also shown in the bottom half of FIG. 7 is the calculation of the current EGR fraction. The calculation is based on the following analysis.

The output of the integrator in this calculation is defined as u, the ratio of the mass fraction of exhaust gas to fresh air in the intake manifold. Then the quantity y=u/(1+u) represents the EGR fraction of the entire gas quantity in the intake manifold. The dynamics of the ratio u are described by the equation $$\dot{u} = \frac{(1+u)RT_m}{P_m V_m}(\dot{m}_{ei} - u\dot{m}_{ai}) \qquad (1)$$

where $\dot{m}_{ei}$ is the mass flow rate of exhaust gas into the manifold and $\dot{m}_{ai}$ is the mass flow rate of fresh air into the manifold. From this equation it is clear that if the difference $(\dot{m}_{ei}-u\dot{m}_{ai})$ is positive then the ratio of the instantaneous incoming flow exceeds the existing mass fraction currently in the manifold and thus the derivative is positive. Conversely, if this difference is negative then the opposite is true and the derivative is negative. The coefficient $$\frac{(1+u)RT_m}{P_m V_m}$$

which regulates this dynamic is obtained by representing u as the ratio of partial pressures due to the EGR gas and intake air, differentiating and then substituting for the values of pdot obtained by differentiating the ideal gas law equation. This yields $$\dot{u} = \frac{d}{dt}\left(\frac{P_{EGR}}{P_{air}}\right) = \frac{\dot{P}_{EGR} - u\dot{P}_{air}}{P_{air}} = \frac{RT_m}{P_{air}V_m}(\dot{m}_{ei} - u\dot{m}_{ai}).$$

Now substituting the expression $P_m=(1+u)P_{air}$, i.e. the total manifold pressure is equivalent to a proper scaling of the partial pressure due to intake air only, equation (1) for u dot described above is obtained. This is the formula that is used in the calculation flow represented at the bottom of FIG. 7.

Referring to FIG. 7, the previous value of u from the integrator is multiplied by the previous MAF measurement to obtain previous exhaust gas flow rate. The previous exhaust gas flow rate is subtracted from the current estimated rate to obtain a value for $m_{ei}$ dot–$um_{ai}$ dot. This value is multiplied by 1+u and RT and divided by manifold volume and estimated MAP to obtain the value for u dot which enters the integrator for this calculation. The new value of u produced in the integrator is divided by 1+u to produce the new EGR fraction. Of course, the new value of u is used in the next calculation cycle to compute the next value of EGR fraction.

Thus, by using an intake system model like that illustrated in FIG. 3 values of estimated MAP for healthy and for faulty EGR systems are calculated every fraction of a second over a period of minutes or seconds to accumulate several thousand data points for these estimates. These estimates are then compared to each other and with corresponding values of $MAP_{MEAS}$ as described in FIG. 8 to determine whether there is in fact a fault in the EGR system.

Evaluation of Map Estimates and Measured Map Values

Figure 8:
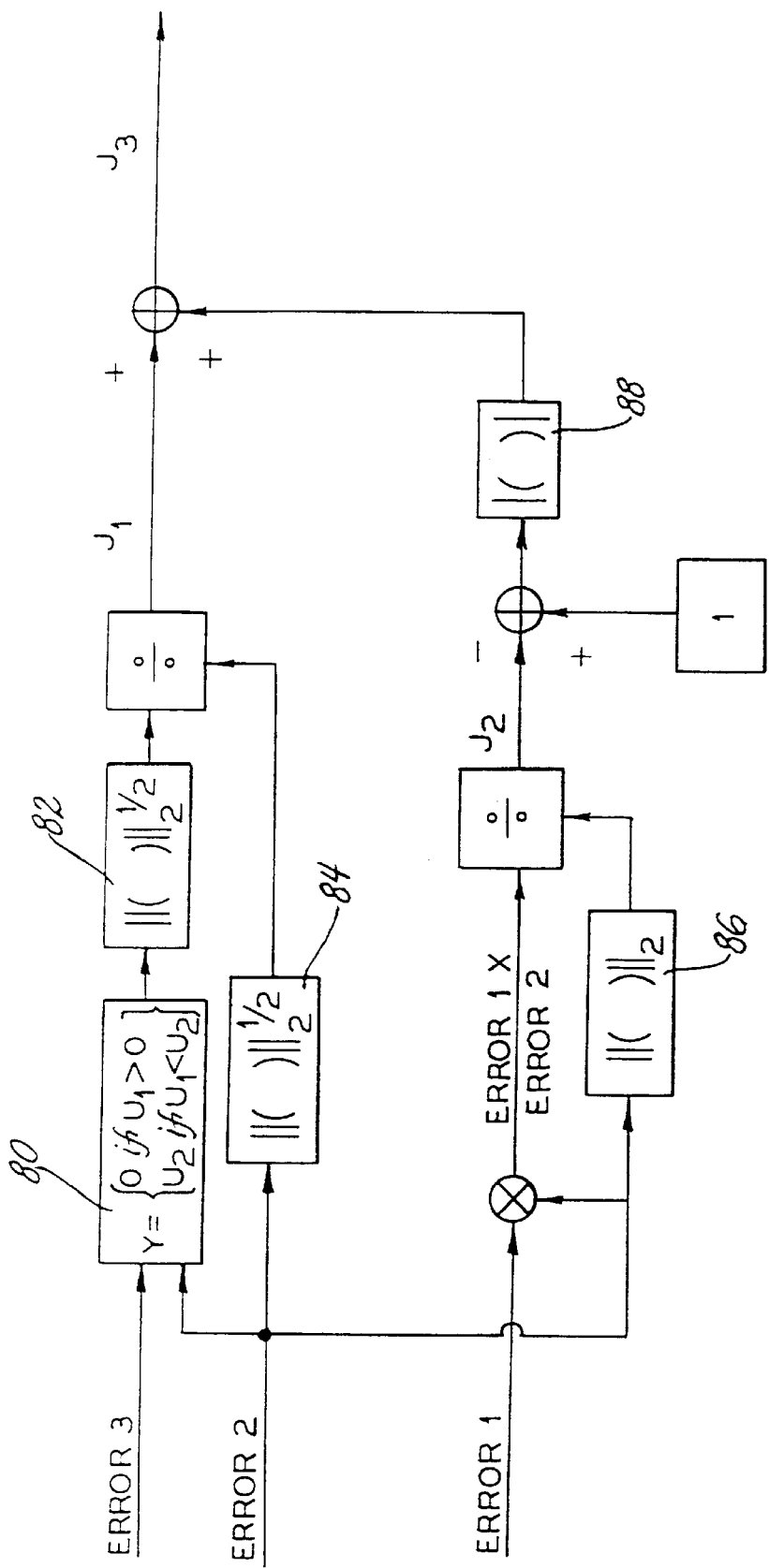
FIG. 8 is a flow diagram for error processing of the MAP data measured and estimated in accordance with this invention.

FIG. 8 illustrates a preferred method of processing the values of the error calculations described above in this specification as referred to in the Residual Processing Block of FIG. 1. The inputs to this block are the three error signals: Error 1, Error 2 and Error 3. As described Error 1 is the basic MAP estimation error, i.e. the difference between the measured MAP and the healthy estimated MAP. Error 2 is the predicted MAP error associated with a given EGR restriction, i.e. the difference between the faulty estimated MAP and the healthy estimated MAP. Error 3 is the difference between Error 2 and Error 1, i.e. the difference between the faulty estimated MAP and the measured MAP.

The process shown in the top half of FIG. 8 focuses on computing the "size" of the Error 3 signal as measured by the energy within this signal. This metric is computed by squaring the individual signal value at each time point and summing all of these values to obtain a single number. The energy of the signal is then obtained by dividing by the number of individual time points and taking the square root of the result. That is the operation that is indicated in calculation block 82 of FIG. 8

If the "size" of Error 3 is small, then the measured MAP is close to the faulty estimated MAP, suggesting that the EGR system is faulty. Conversely, if the "size" of Error 3 is large then the measured MAP differs significantly from the faulty estimated MAP, suggesting that the system is healthy. However, to make this procedure more robust it is preferred that the following adjustments be made. First, the Error 3 signal is processed to set all positive values equal to zero (first line of calculation block 80). This is done for the following reason. It is known that Error 2 (the predicted MAP error associated with an EGR restriction) is always negative. The estimated value for MAP with an EGR valve restriction is always less than then estimated value for MAP in a healthy EGR system. Any positive values of Error 3 then are often due to modeling error, sensor noise or negative MAP sensor biases or faults and serve no purpose other than to distort this signal. This adjustment essentially serves to further emphasize data associated with large EGR valve commands. The faulty MAP estimates are obtained from a faulty model designed to detect the desired magnitude of EGR faults. A positive value of Error 3 implies that the measured MAP value is even smaller than the faulty MAP estimate corresponding to the contrived fault, suggesting that the true fault is even worse than expected. Since the indication of an EGR fault corresponds with small values of Error 3, zeroing out these points maximizes their contribution towards this goal.

Second, it is preferred to use the instantaneous Error 2 value as a lower bound for the Error 3 signal (second line of calculation block 80). This is done to limit the potential impact of any single point in this "size" computation to the theoretical impact of an EGR fault at that point (the Error 2 value). This prevents a few abnormally large negative values from distorting the computed size of the Error 3 signal.

Third and finally, it is preferred to normalize the computation of the "size" of the Error 3 signal by basing the diagnostic decision on the ratio of the energy in the signals Error 3 and Error 2. This is done because a large or small size of Error 3 alone is not completely meaningful. It must be judged in context to the potential size impact of an EGR fault. Thus it is preferred to look at the ratio of the sizes of Error 3 and Error 2 which is termed, J1, to get a better indication of the system's health. Due to the limiting functions imposed in block 80, this number will take on values between 0 and 1.

$$J_1 = \frac{\|Error3\|}{\|Error2\|}.$$

Calculation block 82 in FIG. 8, indicates the execution of the operation $\|Error 3\|$, as defined above. It means that each instantaneous value of Error 3 determined by the powertrain control module over a period of, e.g., minutes is squared and the sum of such values accumulated until several thousand such values has been obtained. Preparatory to the calculation in block 82, values of Error 3 are entered as $u_1$ in block 80 and values of Error 2 are entered as $u_2$. The proper value of y from block 80 is entered in block 82. For example, 5000 to 6000 such values of y may be included in the operation. The sum of the squares is then divided by the number of such values and the square root of the sum then determined. This operation establishes the value for the numerator in the above equation for $J_1$. The same operation is conducted on an identical number of Error 2 values to determine the denominator. See calculation block 84 in FIG. 8.

Physically speaking the numerator of this expression represents the energy encompassed within the signal Error 3 because many values over time are involved in determining the numerator. This value is divided by the energy encompassed within the signal Error 2 to normalize this ratio.

The potential range of scenarios for this ratio are represented by the following two ideal cases. In an ideal case with a healthy vehicle, Error 1=0, i.e. the no-throttle MAP estimates exactly match the measured MAP values. Then Error 3=Error 2 and it is evident that $J_1$=1. In an ideal case with an EGR restricted vehicle, Error 1=Error 2, i.e. the no-throttle MAP estimates due to a vehicle with a simulated EGR restriction exactly match the measured MAP values. Then, Error 3=0 and it is evident that $J_1$=0.

The lower half of FIG. 8 focuses on computing the correlation between the Error 1 and Error 2 signals. If an EGR fault is present then these two signals should be similar. If not, then these signals should look quite different. To make this comparison we first compute the cross product of the two signals, i.e. compute Error 1*Error 2 each calculation cycle and sum the results. If the sign of the corresponding Error 1 and Error 2 signals agree at any single time point then the resulting contribution to the cross product will be positive. If not, then the resulting contribution will be negative.

The mathematical operator $\| \; \|$ in calculation box 86 denotes a calculation of the "size" of the Error 2 signal. Each value of Error 2 is squared, the squared values are added and the sum divided by the number of values. Again, the size of a single signal alone is not necessarily the most meaningful measure of information.

The process now computes the ratio $J_2$. The cross product of Error 1 and Error 2 is divided by the by the "size" of Error 2 to produce $J_2$.

$$J_2 = \frac{Error1 * Error2}{\|Error2\|^2}$$

The values of $J_2$ range between −1 and 1 with the maximum value occurring if Error 1 and Error 2 were identical signals. In this case the square root of the cross product and the energy contained in Error 2 would be identical and $J_2$ would take on its maximum possible value of 1. This is precisely what should occur when an EGR fault is present because in this case the basic MAP estimation error, Error 1, should exactly equal the predicted faulty MAP estimation error, Error 2. Conversely, for a healthy vehicle, Error 1 should have a value of zero because the measured MAP should exactly match the healthy predicted MAP. This should produce a cross product term and consequently a $J_2$ value equal to zero.

In calculation block 88, the absolute value of the difference $1-J_2$ is determined.

The metric used to make a diagnostic decision is computed from the values of $J_1$ and $J_2$. This metric is given by $J_3 = J_1 + |1-J_2|$. The value of $J_3$ ranges between 0 and 2 where theoretically $J_3 = 0$ when the EGR is faulty and $J_3 = 2$ when the EGR is healthy. The specific diagnostic decision for each individual vehicle is made by comparing the value of $J_3$ with an experimentally determined threshold value.

The threshold selection and final tuning of the passive EGR diagnostic is a heavily application and test data dependent process. This procedure involves collecting experimental test data from numerous vehicles under a variety of operating conditions. In specific examples, this has involved data collection from a fleet of a dozen or more healthy test vehicles to account for vehicle-to-vehicle variations, data collection from a single test vehicle under different environmental and geographical conditions to account for differences due to climate and altitude and data collection from vehicles equipped with specially designed restrictor plates installed to simulate EGR blockage faults. Ultimately all of this test data was run through the subject algorithm to compare and contrast the result from all of these different data sets.

As expected, the metric defined in the algorithm showed a clear separation between the healthy and EGR faulty vehicles. For the EGR faulty vehicles the values of the metric $J_3$ clustered around 0.4–0.5 while the lowest values for any set of healthy vehicles were around 1.1. Given these results a threshold of roughly 0.7 or 0.75 was selected for the $J_3$ metric. Vehicles whose $J_3$ metric were above this value were deemed to be healthy while vehicles with $J_3$ values below this level were deemed EGR faulty.

While the invention has been described in terms of a specific preferred embodiment it is apparent the other forms could readily be adapted by persons skilled in the art. Accordingly the scope of the invention is to be considered limited only by the following claims.

What is claim is:

1. A method for diagnosis of a gas flow restriction in the exhaust gas recirculation (EGR) system of an automotive vehicle; said vehicle comprising an engine with an intake manifold and an exhaust gas manifold, a pressure sensor for measuring the pressure of air and any exhaust gas in said intake manifold, a sensor for measuring mass air flow rate in said manifold, a sensor for determining the speed of said engine, an exhaust gas recirculation (EGR) valve and passage system for diverting engine exhaust gas from said exhaust manifold to said intake manifold, and a computer for receiving data from said sensors and controlling the flow position of said EGR valve, said method being carried out on said computer and comprising repeatedly measuring said pressure in said intake manifold, as MAPmeas, during an EGR valve diagnosis period of time, repeatedly estimating the absolute pressure in said intake manifold during said diagnosis period assuming no restriction in the flow of exhaust gas with respect to said control position, said estimates being $MAP_{HE}$, repeatedly estimating the absolute pressure in said intake manifold during said diagnosis period assuming a restriction in the flow of exhaust gas through said EGR valve amounting to a defect in said EGR system, said estimates being $MAP_{FE}$, and comparing the differences between values of MAPmeas taken during said diagnosis period with both of corresponding values of $MAP_{HE}$ and $MAP_{FE}$ as a passive computational basis for determining whether there is a defective restriction in said EGR system.

2. A method for diagnosis of a gas flow restriction in an EGR system as recited in claim 1 comprising repeatedly estimating the absolute pressure in said intake manifold using input data comprising engine speed, measured or estimated barometric pressure, mass rate of intake air flow in said intake manifold and the present control command position of said EGR valve over said diagnosis period and assuming no restriction in the flow of exhaust gas with respect to said command position, said estimates being $MAP_{HE}$, repeatedly estimating the absolute pressure in said intake manifold using input data comprising engine speed, measured or estimated barometric pressure, and mass rate of intake air flow in said intake manifold over said diagnosis period and assuming a restriction in the flow of exhaust gas through said EGR valve amounting to a defect in said EGR system, said estimates being $MAP_{FE}$.

3. A method for diagnosis of a gas flow restriction in an EGR system as recited in claim 2 comprising comparing the differences between values of MAPmeas taken during said diagnosis period with both of corresponding values of $MAP_{HE}$ and $MAP_{FE}$ as a passive computational basis for determining whether there is a defective restriction in said EGR system and further comparing said passive computational basis with experimental MAP data obtained on EGR systems of the same engineering specifications with a range of artificially introduced flow impediments as a further basis for determining whether there is a defective restriction in said EGR system.

4. A method for diagnosis of a gas flow restriction in an EGR system as recited in claim 3 in which said range of artificially introduced flow impediments include impediments which amount to EGR system defects and impediments that do not amount to EGR system defects.

5. A method as recited in claim 2 in which said passive computational basis comprises a comparison of errors in the form:

Error $1=\text{MAPmeas}-\text{MAP}_{HE}$,

Error $2=\text{MAP}_{FE}-\text{MAP}_{HE}$, and

Error $3=\text{MAP}_{FE}-\text{MAPmeas}$, and further comprises using successive and corresponding time values of said errors to calculate an error metric $J_3=J_1+|1-J_2|$ by calculation procedures described in this specification.

6. A method for diagnosis of a gas flow restriction in an EGR system as recited in claim 1 comprising comparing the differences between values of MAPmeas taken during said diagnosis period with both of corresponding values of $\text{MAP}_{HE}$ and $\text{MAP}_{FE}$ as a passive computational basis for determining whether there is a defective restriction in said EGR system and further comparing said passive computational basis with experimental MAP data obtained on EGR systems of the same engineering specifications with a range of artificially introduced flow impediments as a further basis for determining whether there is a defective restriction in said EGR system.

7. A method for diagnosis of a gas flow restriction in an EGR system as recited in claim 6 in which said range of artificially introduced flow impediments include impediments which amount to EGR system defects and impediments that do not amount to EGR system defects.

8. A method as recited in claim 7 in which said passive computational basis comprises a comparison of errors in the form:

Error $1=\text{MAPmeas}-\text{MAP}_{HE}$,

Error $2=\text{MAP}_{FE}-\text{MAP}_{HE}$, and

Error $3=\text{MAP}_{FE}-\text{MAPmeas}$, and further comprises using successive and corresponding time values of said errors to calculate an error metric $J_3=J_1+|1-J_2|$ by calculation procedures described in this specification.

9. A method as recited in claim 6 in which said passive computational basis comprises a comparison of errors in the form:

Error $1=\text{MAPmeas}-\text{MAP}_{HE}$,

Error $2=\text{MAP}_{FE}-\text{MAP}_{HE}$, and

Error $3=\text{MAP}_{FE}-\text{MAPmeas}$, and further comprises using successive and corresponding time values of said errors to calculate an error metric $J_3=J_1+|1-J_2|$ by calculation procedures described in this specification.

10. A method as recited in claim 1 in which said passive computational basis comprises a comparison of errors in the form:

Error $1=\text{MAPmeas}-\text{MAP}_{HE}$,

Error $2=\text{MAP}_{FE}-\text{MAP}_{HE}$, and

Error $3=\text{MAP}_{FE}-\text{MAPmeas}$, and further comprises using successive and corresponding time values of said errors to calculate an error metric $J_3=J_1+|1-J_2|$ by calculation procedures described in this specification.

* * * * *